United States Patent
Strohbeck

(10) Patent No.: US 6,578,655 B2
(45) Date of Patent: Jun. 17, 2003

(54) START/DRIVE SYSTEM FOR A VEHICLE

(75) Inventor: Walter Strohbeck, Narre Warren (AU)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 09/778,451

(22) Filed: Feb. 7, 2001

(65) Prior Publication Data

US 2001/0026212 A1 Oct. 4, 2001

(30) Foreign Application Priority Data

Feb. 8, 2000 (AU) ............................................. 14971/00

(51) Int. Cl.[7] ............................................... B60R 25/00
(52) U.S. Cl. .......................................................... 180/287
(58) Field of Search ................................. 180/287, 282; 70/247, 248, 251, 252, 254, 239, 245

(56) References Cited

U.S. PATENT DOCUMENTS

| | | | | |
|---|---|---|---|---|
| 3,680,335 A | * | 8/1972 | Onishi | ........................ 180/286 |
| 5,461,360 A | * | 10/1995 | Guim et al. | ................. 340/457 |
| 5,682,777 A | | 11/1997 | Specht | |
| 6,176,809 B1 | * | 1/2001 | Visser et al. | ................... 477/96 |

FOREIGN PATENT DOCUMENTS

| | | |
|---|---|---|
| AU | 0723285 B | 8/2000 |
| EP | 0943509 A1 | 2/1999 |
| JP | 10 244853 B | 9/1998 |

* cited by examiner

Primary Examiner—Paul N. Dickson
Assistant Examiner—Faye M. Fleming
(74) Attorney, Agent, or Firm—Kenyon & Kenyon

(57) ABSTRACT

A start/drive system for a vehicle includes a selector assembly having a drive/gear selector, a driver authority device, a security system and a lock. The lock provides an initial partial release and a subsequent complete release of the drive/gear selector. An initial movement of the selector triggers an authorization check in order to allow a further complete release of the selector.

17 Claims, 3 Drawing Sheets

START/DRIVE SYSTEM FOR A VEHICLE

BACKGROUND INFORMATION

A known form of vehicle start system utilizes a security measure in the form of requiring presence of an appropriately authorized transponder key within the vehicle in order to allow the vehicle engine to be started or to continue running. The system has a reasonably elaborate antenna arrangement to ensure the key can be detected and interrogated anywhere in the vehicle. Such a system may also include a steering wheel lock which is only disengaged after authorization of the key has been confirmed. Once appropriate authorization is confirmed, a separate motor start/stop means gets activated, after which a gear of the vehicle may be engaged by use of a gear selector assembly. This start/stop means is either embodied in a separate switch assembly or integrated into the gear stick assembly and gets actuated by deliberate movement into the appropriate position.

An object of the present invention is to provide a simplified start system for manual and automatic cars.

SUMMARY OF THE INVENTION

In accordance with the present invention there is provided a start/drive system for a vehicle including:
- a selector assembly having a drive/gear selector, for selecting a plurality of drive conditions or gears;
- driver authority means;
- a security system for conducting an authorization check of the authority means; and
- a lock providing for initial partial and subsequent complete release of the drive/gear selector in which initial movement of the selector triggers the authorization check in order to allow the further complete release of the selector.

Preferably, motor start is effected by moving the drive selector, after release from the lock, towards or into a drive/gear position. Alternatively, motor start is effected automatically if the authorization check is successful.

Preferably, the system includes operating means including at least one of an accelerator pedal, engine speed sensor, foot brake, hand brake, clutch and the drive/gear selector, and authorization and/or status of the operating means determines whether motor start/stop is permitted.

Preferably, the vehicle is provided with manual transmission and the lock, when in the engaged position, restricts the selector to lateral movement in a neutral gear position, the authorization check being activated by lateral movement of the selector to a side of a central position corresponding to the initial position of the selector.

More preferably, the motor stop is effected by moving the selector to a position opposite an authorization check position, subject to status of at least one operating means.

Alternatively, the vehicle is provided with automatic transmission and the lock is in the form of a locking plunger which, when in the engaged position, restricts the selector to limited movement from a "park" position. Preferably, for automatic transmission, motor stop is effected by moving the selector into the "park" position, subject to status of at least one operating means.

Preferably, the authority means is in the form of a key and the system includes a receptacle for receipt of the key, wherein the key must be present in the receptacle for completion of the authorization check.

Preferably, the key includes a transponder and is at least partially adapted to form-fit within the receptacle.

Preferably, a closure device is provided in association with the receptacle for preventing access to the receptacle.

Preferably, the closure device is actuated by movement of the selector away from the initial position, following release of the lock.

Preferably, the closure device is moved to an open condition when the motor of the vehicle is stopped and the selector is returned to the initial position.

Preferably, the security system includes a detector provided in a wall of the receptacle for checking proper placement of the key.

Preferably, the system includes an indicator, such as an audible alarm, which is activated if the key is left unintentionally in the receptacle after the vehicle motor is stopped.

DETAILED DESCRIPTION

Figure 1:
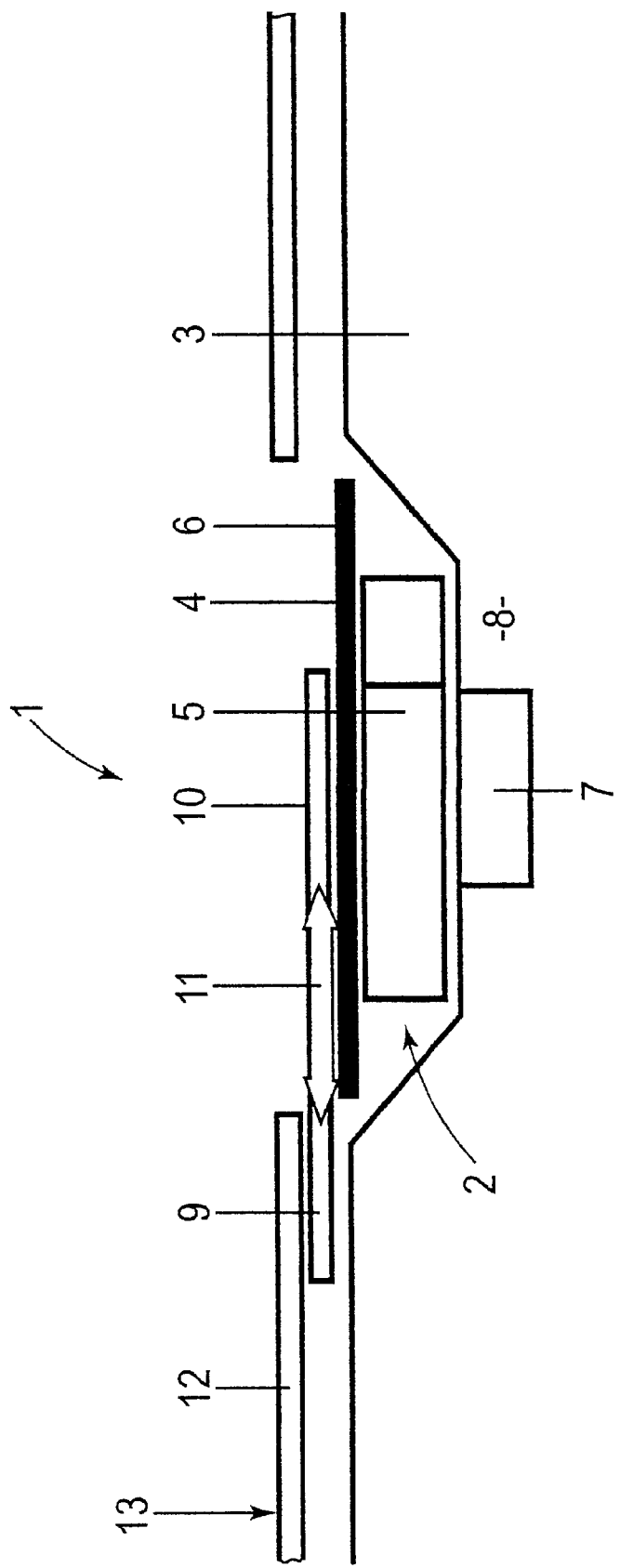
FIG. 1 is a diagrammatic side view of a receptacle used in a system of the present invention.

Referring firstly to FIG. 1 a part of a vehicle start system 1 is shown as including a receptacle 2 which is formed in a housing 3 and arranged for receipt of a key 4 in the form of a transponder 5 mounted on a card 6. The receptacle is arranged for form-fit engagement with at least part of the key 4 although the key may instead be housed freely within the receptacle. A detector 7 is provided in a wall 8 of the receptacle 2 for the purpose of checking proper placement of the key.

Figure 2:
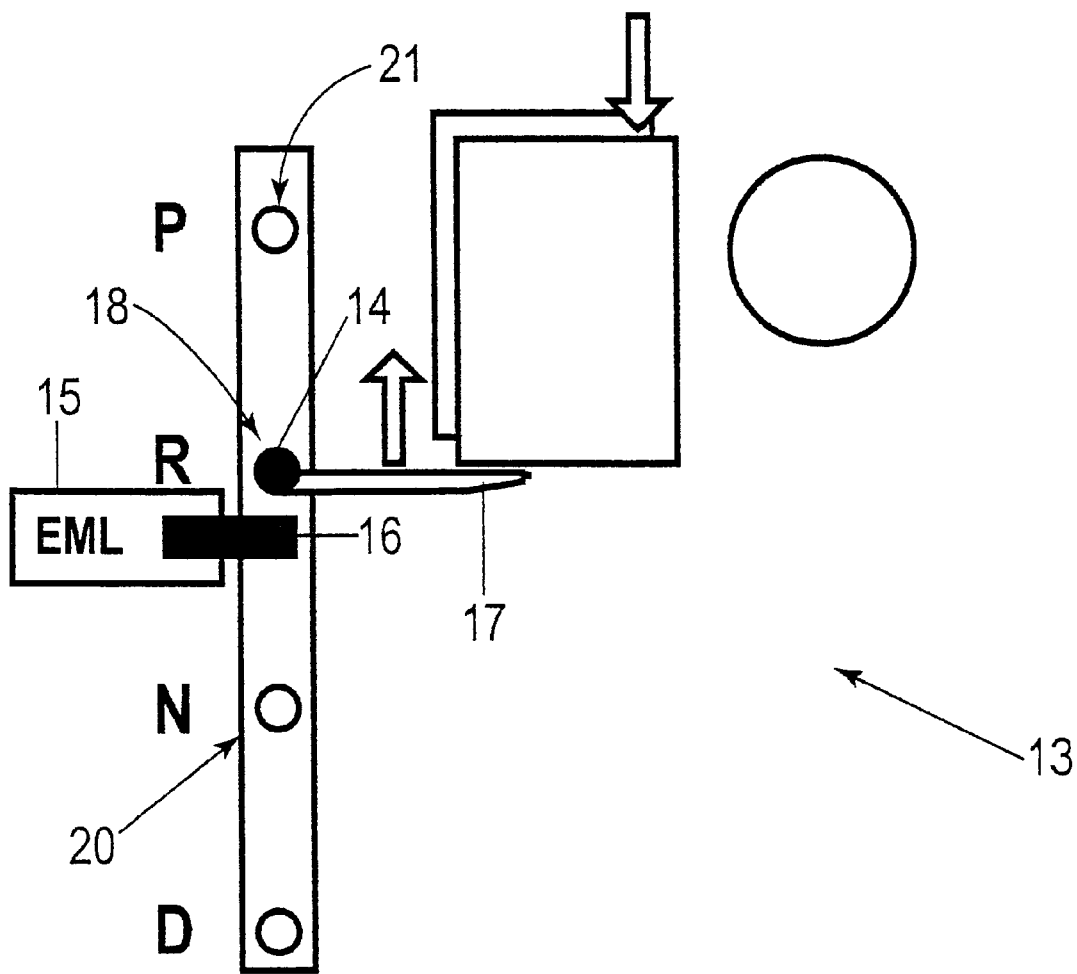
FIG. 2 is a diagrammatic plan view of the system.

A closure device 9 in the form of a cover 10 is provided to close over the receptacle 2 and prevent access to the receptacle. The cover 10 is shown as sliding in a direction indicated by arrow 11 although a pivoting cover may instead be utilized. The receptacle 2 and cover 10 are preferably arranged beneath a housing 12 of a gear selector assembly 13, as more clearly shown in FIG. 2.

The selector assembly 13 includes a gear selector 14 which is capable of moving between a number of positions which correspond to different vehicle drive conditions such as park "P", reverse "R", neutral "N" and drive "D". A lock 15, such as an electromechanical device with a locking plunger 16, is also provided to selectively restrict movement of the gear selector 14.

In use of the system, the cover 10 is initially in an open position. To start the vehicle, the key 4 is inserted in the receptacle 2 and the selector 14 advanced from an initial park position "P" to a location indicated by arrow 18. At the position 18, an authorization check is undertaken by a security system (not shown) such that the transponder 5 is interrogated to ensure the key 4 carries appropriate authorization. Communication with the key may be by way of suitable electromagnetic coupling or direct electrical connection. Upon confirmation of authorization, the lock 15 is disabled for complete release of the gear shifter to allow it to be advanced to one of the positions corresponding to a drive condition such a "N" or "D". In the process, the selector passes a start position, indicated by arrow 20, where an appropriate start trigger is actuated to start the vehicle engine. The preferred start position is at position "N" although any other position such as between "N" and "R" may instead be adopted, as appropriate. As an alternative, the motor start may be effected automatically if the authorization check is successful. The selector may also be arranged to engage a trigger 17 which actuates the capture device, to close the cover 10 and secure the key within the receptacle 2.

To stop the engine, the selector 14 may be returned toward the park position "P" so as to engage the trigger and open the door. The selector 14 may then be advanced to a stop position 21 to stop the engine, or alternatively, a switch 22 may instead be used. In either case, the status of other vehicle operating means is firstly checked to ensure motor stop is permitted. For example, the status of a handbrake, footbrake, clutch, engine speed accelerator pedal, etc. must firstly be checked before the engine is stopped. Similarly, an appropriate check of the relevant operating means also needs to be conducted to start the motor.

Once the engine has been stopped and the door 10 is in an open position, an indicator in the form of an audible alarm or the like will be activated to remind the driver that the key 4 is unintentionally left within the receptacle. The indicator may continue to sound until the key 4 is removed.

Figure 3:
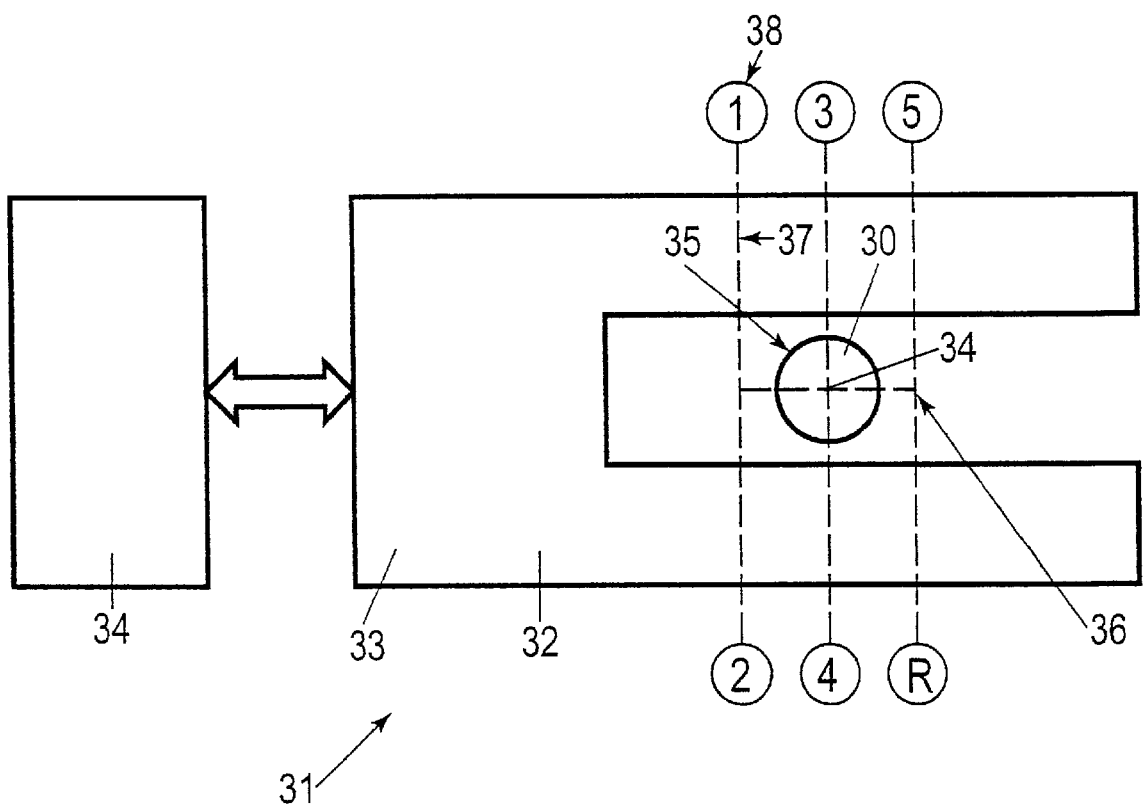
FIG. 3 is a diagrammatic plan view of a selector lock used in a vehicle with manual transmission.

The system I has been described above with reference to a vehicle with automatic transmission however the same system may equally be applied to a vehicle with manual transmission where the initial position 18 may, for example, correspond to a central position of the gear selector when in "neutral". By way of example, reference may be made to FIG. 3, where a selector 30 for a system 31 of a manual transmission vehicle is shown in a neutral position, with a selector lock 32 in an engaged position whereby movement of the selector to the gears, indicated as "1", "2", "3", "4", "5", "R" is prevented. All other features of system 31 are the same as those described with reference to the system 1 described with reference to FIGS. 1 and 2 and have been omitted for clarity. The lock 32 is in the form of an open-ended bracket 33 arranged such that the selector is permitted limited lateral movement of the selector from a central position 35 to the left or right, as viewed, against 0 a spring bias (not shown). Lateral movement of the selector 14 to one side of the central position, to the left, for example, initiates a security check of the key 4 and if confirmation of appropriate authorization is received, an electromagnetic actuator 34 is operated to move the bracket 33 to the left, as viewed, to release the selector for movement into the other gears. The motor may then be started by advancing the selector 30 toward first gear "1" whereby motor start may be effected at, for example, either of positions 37 or 38. Again, however, the motor start function may be effected automatically upon receipt of authorization. In either case, a stop function may also be actuated through use of the gear selector, by moving the selector to a position 36, to a position opposite that in which the authorization check is conducted subject to appropriate status of a related operating means, such as engagement of both a hand brake and a foot brake. Appropriate operating means status may also be used to facilitate motor start, for example, motor start is only permitted in combination with the clutch being depressed.

As may be appreciated from the above, the system of the present invention provides a simplified vehicle start system in that the vehicle motor may be started and stopped using a conventional gear selector, in a manner in which an authorization check and start procedure are effectively rendered transparent to the driver since no independent action is needed to activate either. In addition, elaborate antenna arrangements are not required in order to verify transponder authorization and the interrelationship between the closure device and the gear selector allows movement of the selector during a start-stop procedure to also be used for the purpose of opening and closing the door 10. Further, provision of a lock 15, 30 to bar movement of the shifter itself also renders a steering wheel lock or the like as redundant. The overall assembly may then be provided in the form of a modular unit to assist in reducing production and installation costs. Another significant advantage is that a conventional gear selector assembly needs little modification, with the exception of addition of appropriate switches and a lock to realize the broader aspect of the present invention and the use of pre-existing component parts may further reduce manufacturing costs and indeed render the present invention suitable for retrofitting to existing vehicles.

What is claimed is:

1. A start/drive system for a vehicle, comprising:
    a selector assembly including a drive/gear selector for selecting at least one of: (a) at least one drive condition and (b) at least one gear;
    a driver authority device;
    a security system for conducting an authorization check of the driver authority device; and
    a lock for providing an initial partial release and a subsequent complete release of the drive/gear selector, an initial movement of the drive/gear selector triggering the authorization check in order to allow a further complete release of the drive/gear selector.

2. The start/drive system according to claim 1, wherein a motor start is effected by moving the selector, after release of the lock, one of towards and into a drive/gear position.

3. The start/drive system according to claim 1, wherein a motor start is effected automatically if the authorization check is successful.

4. The start/drive system according to claim 1, further comprising an operating device including at least one of an accelerator pedal, an engine speed sensor, a foot brake, a hand brake, a clutch and the drive/gear selector, the operating device having at least one of an authorization and a status determining whether a motor start/stop is permitted.

5. The start/drive system according to claim 1, wherein the vehicle has a manual transmission, and wherein the lock, when in an engaged position, restricts the selector to a lateral movement in a neutral gear position, the authorization check being activated by a lateral movement of the selector to a side of a central position corresponding to an initial position of the selector.

6. The start/drive system according to claim 4, wherein a motor stop is effected by a lateral movement of the selector to a position opposite an authorization check position, subject to a status of the operating device.

7. The start/drive system according to claim 1, wherein the vehicle has an automatic transmission, and wherein the lock has a locking plunger which, when in an engaged position, restricts the selector to a limited movement from a park position.

8. The start/drive system according to claim 4, wherein a motor stop is effected by moving the selector into a park position, subject to a status of the operating device.

9. The start/drive system according to claim 1, wherein the authority device includes a key, and further comprising a receptacle for receipt of the key, wherein the key must be present in the receptacle for completion of the authorization check.

10. The start/drive system according to claim 9, wherein the key includes a transponder and is adapted to at least partially form-fit within the receptacle.

11. The start/drive system according to claim 9, further comprising a closure device cooperating with the receptacle for preventing access to the receptacle.

12. The start/drive system according to claim 11, wherein the closure device is actuated by a movement of the selector away from an initial position, following a release of the lock.

13. The start/drive system according to claim 12, wherein the closure device is moved to an open condition when a motor of the vehicle is stopped and the selector is returned to the initial position.

14. The start/drive system according to claim 9, wherein the security system includes a detector situated in a wall of the receptacle for checking proper placement of the key.

15. The start/drive system according to claim 9, further comprising an indicator which is activated if the key is left unintentionally in the receptacle after a motor of the vehicle is stopped.

16. The start/drive system according to claim 15, wherein the indicator includes an audible alarm.

17. The start/drive system according to claim 1, further comprising:
   an operating means, wherein a status of the operating means determines whether at least one of a motor start and a motor stop is permitted.

\* \* \* \* \*